(12) United States Patent
Ponnuswamy

(10) Patent No.: US 9,356,676 B2
(45) Date of Patent: May 31, 2016

(54) SYSTEM AND METHODS FOR ADAPTIVE PER-USER MULTIPATH CONTROL FOR SPATIAL MULTIPLEXING GAIN IN MIMO SYSTEMS

(71) Applicant: Aruba Networks, Inc., Sunnyvale, CA (US)

(72) Inventor: Subburajan Ponnuswamy, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 5 days.

(21) Appl. No.: 14/168,702

(22) Filed: Jan. 30, 2014

(65) Prior Publication Data

US 2015/0215025 A1    Jul. 30, 2015

(51) Int. Cl.
  *H04W 4/00* (2009.01)
  *H04B 7/06* (2006.01)
  *H04L 5/00* (2006.01)

(52) U.S. Cl.
  CPC ............ *H04B 7/0697* (2013.01); *H04L 5/0023* (2013.01); *H04L 5/0055* (2013.01)

(58) Field of Classification Search
  USPC ................. 370/208–252, 312–329, 330–336; 375/144–260
  See application file for complete search history.

(56) References Cited

U.S. PATENT DOCUMENTS

| | | | |
|---|---|---|---|
| 8,289,935 B2 * | 10/2012 | Frederiksen et al. ......... | 370/337 |
| 8,514,783 B2 * | 8/2013 | Lee et al. ...................... | 370/328 |
| 8,531,939 B2 * | 9/2013 | Yoon et al. ..................... | 370/203 |
| 8,902,849 B2 * | 12/2014 | Noh et al. ..................... | 370/330 |
| 8,953,522 B2 * | 2/2015 | Han et al. ...................... | 370/328 |
| 8,964,520 B2 * | 2/2015 | Yoon et al. .................... | 370/203 |
| 2009/0262856 A1 * | 10/2009 | Onggosanusi et al. ....... | 375/267 |
| 2011/0142107 A1 * | 6/2011 | Pan et al. ....................... | 375/219 |
| 2012/0281656 A1 * | 11/2012 | Hooli et al. ................... | 370/329 |
| 2013/0034011 A1 * | 2/2013 | Yoon et al. .................... | 370/252 |
| 2013/0148635 A1 * | 6/2013 | Park et al. ..................... | 370/335 |

* cited by examiner

*Primary Examiner* — Man Phan
(74) *Attorney, Agent, or Firm* — Mannava & Kang, P.C.

(57) ABSTRACT

Disclosed herein is a system, apparatus, and method for adaptive per-user multipath control for spatial multiplexing gain in MIMO systems. Transmission parameters relating to Cyclic Shifts and/or Radio Frequency (RF) antenna beams are modified and tested to find optimal transmission parameters that enable better exploitation of multipath RF propagation and therefore better spatial multiplexing gain.

22 Claims, 6 Drawing Sheets

SYSTEM AND METHODS FOR ADAPTIVE PER-USER MULTIPATH CONTROL FOR SPATIAL MULTIPLEXING GAIN IN MIMO SYSTEMS

FIELD

The present disclosure relates to wireless network devices. In particular, an embodiment of the present disclosure relates to a system and method for adaptive per-user multipath control for spatial multiplexing gain in Multiple-Input Multiple-Output (MIMO) systems.

BACKGROUND

In a wireless digital network, such as a Wireless Fidelity (Wi-Fi) network operating in accordance with the IEEE 802.11n standard or the IEEE 80.211ac standard, several multiple-antenna techniques may be utilized to improve the capacity and the performance of the system. Such techniques may include spatial multiplexing and beamforming, etc.

The technique of spatial multiplexing exploits multipath propagation of Radio Frequency (RF) signals to improve the reliability of signals, thereby improving the signal-to-noise ratio (SNR). When the spatial multiplexing technique is utilized, for a given SNR, the spatial multiplexing gain and the ability to support higher multi-stream Modulation and Coding Scheme (MCS) depend on the ability of the receiver to reliably decode each spatial stream.

Techniques such as transmit beamforming (TxBF) are used to improve the SNR of specific clients. However, these techniques may reduce spatial multiplexing gain due to the reduction in transmit diversity.

BRIEF DESCRIPTION OF THE DRAWINGS

Embodiments of the disclosure may best be understood by referring to the following description and accompanying drawings that are used to illustrate embodiments of the disclosure by way of example and not limitation. In the drawings, in which like reference numerals indicate similar elements.

DETAILED DESCRIPTION

Figure 1:
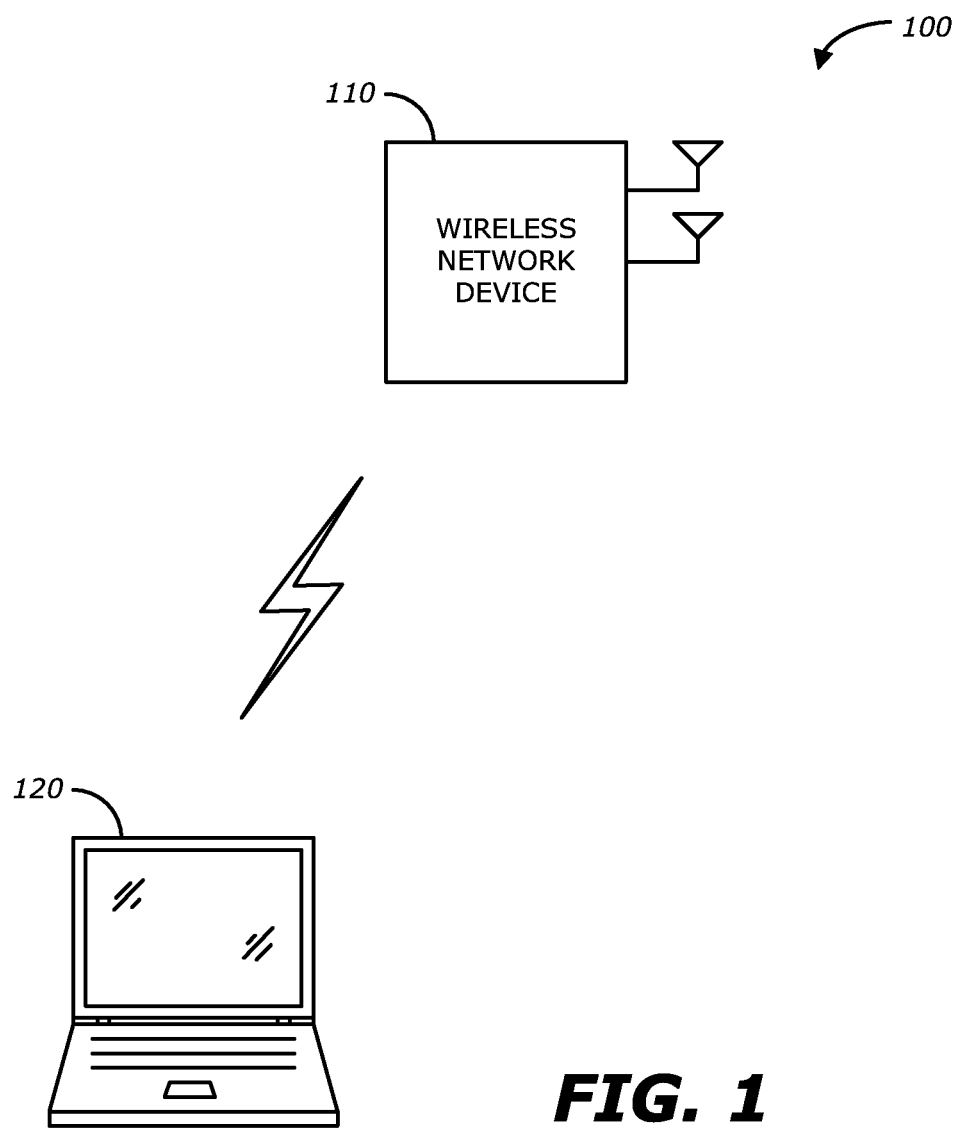
FIG. 1 illustrates an exemplary hardware environment in which embodiments of the disclosure may be practiced.

In the following description, numerous specific details are set forth. However, it is understood that embodiments of the disclosure may be practiced without these specific details. In other instances, well-known circuits, structures, and techniques have not been shown in detail in order not to obscure the understanding of this description.

Disclosed herein is a system, apparatus, and method for adaptive per-user multipath control for spatial multiplexing gain in MIMO systems. Transmission parameters relating to Cyclical Shift Diversity (CSD) and/or Radio Frequency (RF) beams are modified and tested to find optimal transmission parameters that enable better exploitation of multipath RF propagation and therefore better spatial multiplexing gain.

For example, disclosed herein, one embodiment of the disclosure is directed to a system, apparatus, and method for adaptive per-user multipath control for spatial multiplexing gain in MIMO systems. Such adaptive multipath control may be achieved by transmitting a first plurality of packets from a first device to a second device, where the first plurality of packets are transmitted using a plurality of radio frequency chains. Each radio frequency chain may be associated with a different cyclic shift value in a first set of cyclic shift values. Based on performance information, at least one cyclic shift value in the first set of cyclic shift values may be dynamically modified to obtain a second set of cyclic shift values. Thereafter, a second plurality of packets are transmitted from the first device to the second device, where the second plurality of packets is transmitted using the plurality of radio frequency chains. Each radio frequency chain is associated with a different cyclic shift value in the second set of cyclic shift values.

Disclosed herein, another embodiment of the disclosure is directed to a system, apparatus, and method for adaptive per-user multipath control for spatial multiplexing gain in MIMO systems. Such adaptive multipath control may be achieved by transmitting a first plurality of packets from a first device to a second device, where the first plurality of packets are transmitted using a plurality of data streams. Each data stream may be associated with a different cyclic shift value in a first set of cyclic shift values. Based on performance information, at least one cyclic shift value in the first set of cyclic shift values may be dynamically modified to obtain a second set of cyclic shift values. Thereafter, a second plurality of packets are transmitted from the first device to the second device, where the second plurality of packets is transmitted using the plurality of data streams. Each data stream is associated with a different cyclic shift value in the second set of cyclic shift values.

Disclosed herein, yet another embodiment of the disclosure is directed to a system, apparatus, and method for adaptive per-user multipath control for spatial multiplexing gain in MIMO systems. Such adaptive multipath control may be achieved by transmitting a first plurality of packets from a first device to a second device, where the first plurality of packets are transmitted using a plurality of antennas. Each antenna is configured to use a corresponding beam width in a first set of beam widths. Based on performance information, at least one beam width in the first set of beam widths may be dynamically modified to obtain a second set of beam widths. Thereafter, a second plurality of packets are transmitted from the first device to the second device, where the second plurality of packets are transmitted using the plurality of antennas. Each antenna is configured to use a corresponding beam width in the second set of beam widths.

Disclosed herein, yet another embodiment of the disclosure is directed to a system, apparatus, and method for adaptive per-user multipath control for spatial multiplexing gain in MIMO systems. Such adaptive multipath control may be achieved by transmitting a first plurality of packets from a first device to a second device, where the first plurality of packets are transmitted using a plurality of radio frequency chains. Each radio frequency chain is associated with a different cyclic shift value in a set of cyclic shift values. Based on performance information, whether to apply the cyclic shift values before or after applying an Inverse Fourier Transform (IFT) to a second plurality of packets may be dynamically selected. Cyclic shift values are then applied before or after applying the IFT based on the performance information. Thereafter, the second plurality of packets are transmitted from the first device to the second device, where the second plurality of packets are transmitted using the plurality of radio frequency chains.

Of course, other features and advantages of the disclosure will be apparent from the accompanying drawings and from the detailed description that follows below.

In the following description, certain terminology is used to describe features of the disclosure. For example, in certain situations, the term "logic" is representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, an application specific integrated circuit, a wireless receiver, transmitter and/or transceiver circuitry, a semiconductor memory, or a combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of suitable non-transitory storage (computer readable) medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, a hard disk drive, an optical disc drive, or a portable memory device. As firmware, the executable code is stored in persistent storage.

FIG. 1 illustrates an exemplary hardware environment 100 in which embodiments of the disclosure may be practiced. A wireless network device (e.g., a wireless access point, or a mesh node) 110 is communicatively coupled to a data network (not shown) and provides data access connectivity to client device 120 through RF wireless communications. Wireless network device 110 and client device 120 may wirelessly communicate with each other in accordance with one or more standards in the IEEE 802.11 family of standards. Examples of the standards may include the IEEE 802.11n standard and the IEEE 802.11ac standard. Examples of client device 120 may include a laptop, a cellphone, a tablet, a game consoles, a smart TV, and a set-top box, etc.

The disclosure is not limited by the number of client devices that wireless network device 110 serves. Wireless network device 110 may be associated with more than one client devices. Other wireless network devices and other client devices may also be present in the environment. Although wireless network device 110 is shown in FIG. 1 to include two antennas, the disclosure is not so limited, and wireless network device 110 may include more than two antennas.

Figure 2:
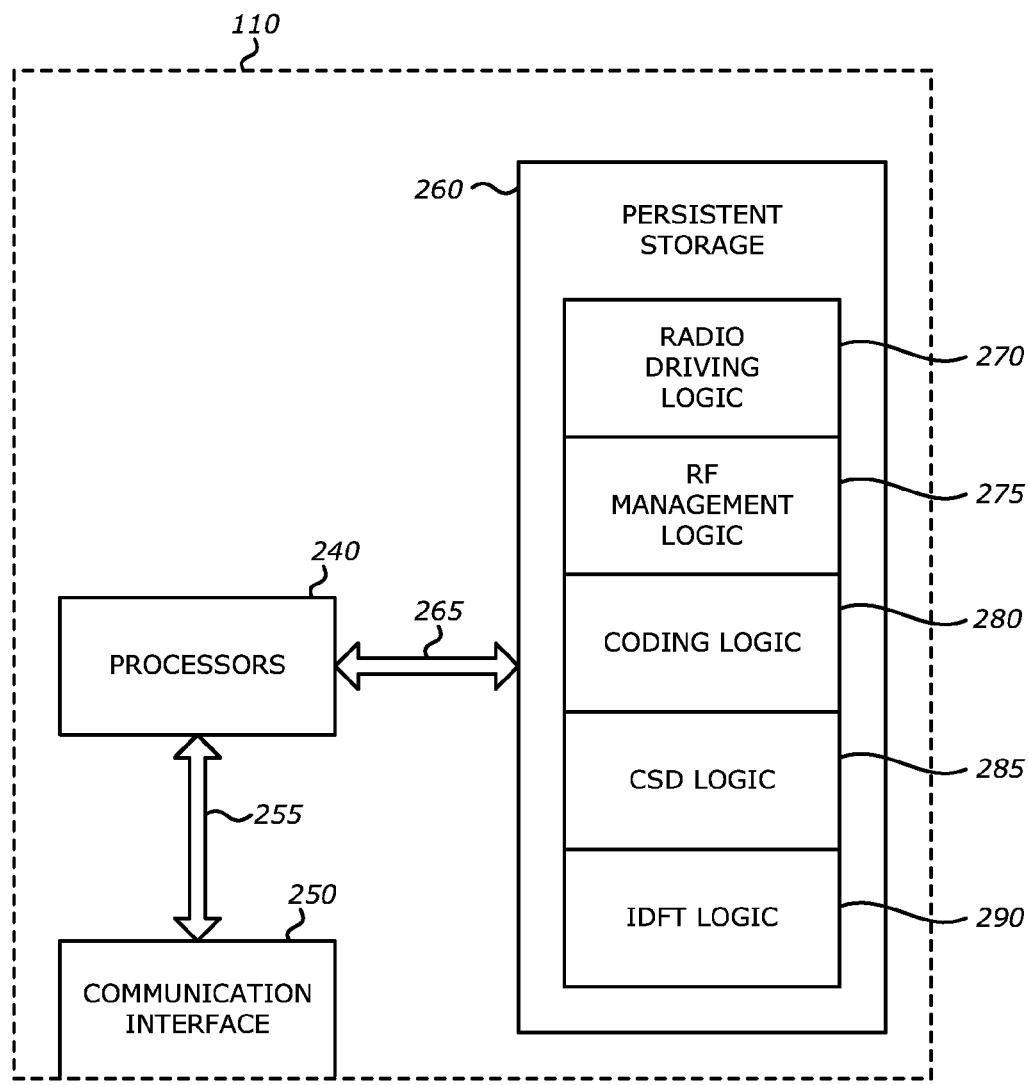
FIG. 2 is an exemplary block diagram of logic associated with a wireless network device.

Referring now to FIG. 2, an exemplary block diagram of logic associated with the wireless network device 110 is shown. Wireless network device 110 comprises one or more processors 240 that are coupled to communication interface logic 250 via a first transmission medium 255. Communication interface logic 250 enables communications with the data network (not shown), with client device 120, and with other parties or devices with which wireless network device 110 may communicate. According to one embodiment of the disclosure, communication interface logic 250 may be implemented as one or more radio units coupled to antennas for supporting RF wireless communications with other devices. Additionally, communication interface logic 250 may be implemented as a physical interface including one or more ports for wired connectors.

Processor 240 is further coupled to persistent storage 260 via transmission medium 265. According to one embodiment of the disclosure, persistent storage 260 may include radio driving logic 270, RF management logic 275, coding logic 280, Cyclic Shift Diversity (CSD) logic 285, and Inverse Discrete Fourier Transform (IDFT) logic 290. Of course, when implemented as hardware, radio driving logic 270, RF management logic 275, coding logic 280, CSD logic 285, and IDFT logic 290 would be implemented separately from persistent memory 260.

In known operation methods, when wireless network device 110 transmits data, it first encodes data streams with coding logic 280. Encoded data streams may then be divided into a number of spatial streams, which are to be transmitted in parallel from more than one antennas. Each of the spatial streams is then interleaved, mapped onto modulation symbols, and grouped into Orthogonal Frequency-Division Multiplexing (OFDM) symbols. Next, space-time block coding and/or cyclic shifts may be applied to the spatial streams, which are then distributed onto the transmit chains through a process called spatial mapping. Cyclic shifts may be alternatively applied to transmit chains after spatial mapping. In each of the transmit chains, the symbols are submitted to an IDFT at IDFT logic 290. Finally, the signals are upconverted to the passband to be transmitted through the antennas. In some implementations, Cyclic Shifts may be applied after the IDFT. Application of cyclic shifts after IDFT results in tone-dependent phase shifts.

By assigning linear combinations of the spatial streams to the RF chains, the technique of spatial multiplexing exploits multipath propagation of RF signals through the use of space diversity to improve the reliability of signals, thereby improving the SNR. When the spatial multiplexing technique is utilized, for a given SNR, the spatial multiplexing gain and the ability to support higher multi-stream MCS depend on the ability of the receiver to reliably decode each spatial stream.

CSD is a known way of achieving transmit diversity and avoiding inadvertent beamforming. CSD introduces a different delay for each signal by cyclically shifting the OFDM symbols. As described above, there are three possible ways to apply the cyclic shifts: 1) cyclic shifts are applied to spatial streams; 2) cyclic shifts are applied to transmit chains (which correspond to RF chains) after spatial mapping but before IDFT; and 3) cyclic shifts are applied to transmit chains after IDFT. Applying cyclic shifts before IDFT results in OFDM symbols being delayed in time, while applying CSD after IDFT results in tone-dependent phase shifts.

Tables 1 and 2 below show the default cyclic shift values for the non-High Throughput (HT) portion (i.e., preamble portion) of packets and the HT portion (i.e., data portion) of packets, respectively, as defined in the IEEE 802.11n standard. It should be noted that for the non-HT portion, cyclic shift values are specified in the standard for each transmit chain, and for the HT portion, cyclic shift values are specified for each space-time stream.

TABLE 1

Cyclic shift for non-HT portion of packet
$T_{CS\,i}^{TX}$ values for non-HT portion of packet

| Number of transmit chains | Cyclic shift for transmit chain 1 (ns) | Cyclic shift for transmit chain 2 (ns) | Cyclic shift for transmit chain 3 (ns) | Cyclic shift for transmit chain 4 (ns) |
|---|---|---|---|---|
| 1 | 0 | — | — | — |
| 2 | 0 | −200 | — | — |
| 3 | 0 | −100 | −200 | — |
| 4 | 0 | −50 | −100 | −150 |

TABLE 2

Cyclic shift values of HT portion of packet
$T_{CS\,iS}^{TX}$ values for HT portion of packet

| Number of space-time streams | Cyclic shift for space-time stream 1 (ns) | Cyclic shift for space-time stream 2 (ns) | Cyclic shift for space-time stream 3 (ns) | Cyclic shift for space-time stream 4 (ns) |
|---|---|---|---|---|
| 1 | 0 | — | — | — |
| 2 | 0 | −400 | — | — |
| 3 | 0 | −400 | −200 | — |
| 4 | 0 | −400 | −200 | −600 |

Techniques such as TxBF are used to improve the SNR of specific clients. However, these techniques may reduce spatial multiplexing gain due to the reduction in transmit diversity.

Embodiments of the disclosure described herein are related to methods for improving spatial multiplexing gain by modifying transmission parameters related to space diversity. These methods may be utilized on the side of wireless network devices without modification to associated client devices that operate in accordance with the one or more IEEE 802.11 standards. These methods may be used with or without TxBF, and may deliver a better overall performance than TxBF alone can deliver. It is also possible to combine these methods, when suitable.

Throughout the disclosure, wireless network device 110 may be alternatively referred to as the first device, and client device 120 may be alternatively referred to as the second device.

First Group of Embodiments

In the first group of embodiments, cyclic shift values for transmit RF chains are modified at CSD logic 285 to achieve optimal performance. The optimal set of cyclic shift values vary depending on the client device, the environment, and/or the MCS used and may change over time. In one embodiment, minimum and maximum cyclic shift values are defined for RF chains so that applying cyclic shifts does not cause Inter-Symbol Interference (ISI) and does not cause shifts that fall out of the maximum delay spread values supported by radio receivers.

In one embodiment, an algorithm (executed by processor 240) for finding the optimal set of cyclic shift values based on performance information is utilized. First, a set of default cyclic shift values are used; the cyclic shift values used are then recursively modified and tested based on performance information until an optimal set of cyclic shift values are found that enable the highest possible MCS with the lowest packet error rate. The optimal set of cyclic shift values may also be defined as the set of cyclic shift values that result in the highest possible SNR. The use of different types of performance information has been contemplated. The performance information may be feedback information such as acknowledgment packets sent by client device 120 and received by network device 110, may be information derived from such feedback information at network device 110, or may be information related to such metrics as Number of Retries in the event that network device 110 fails to receive feedback information from client device 120. Examples of the types of performance information provided herein are illustrative and do not limit the invention.

Figure 3:
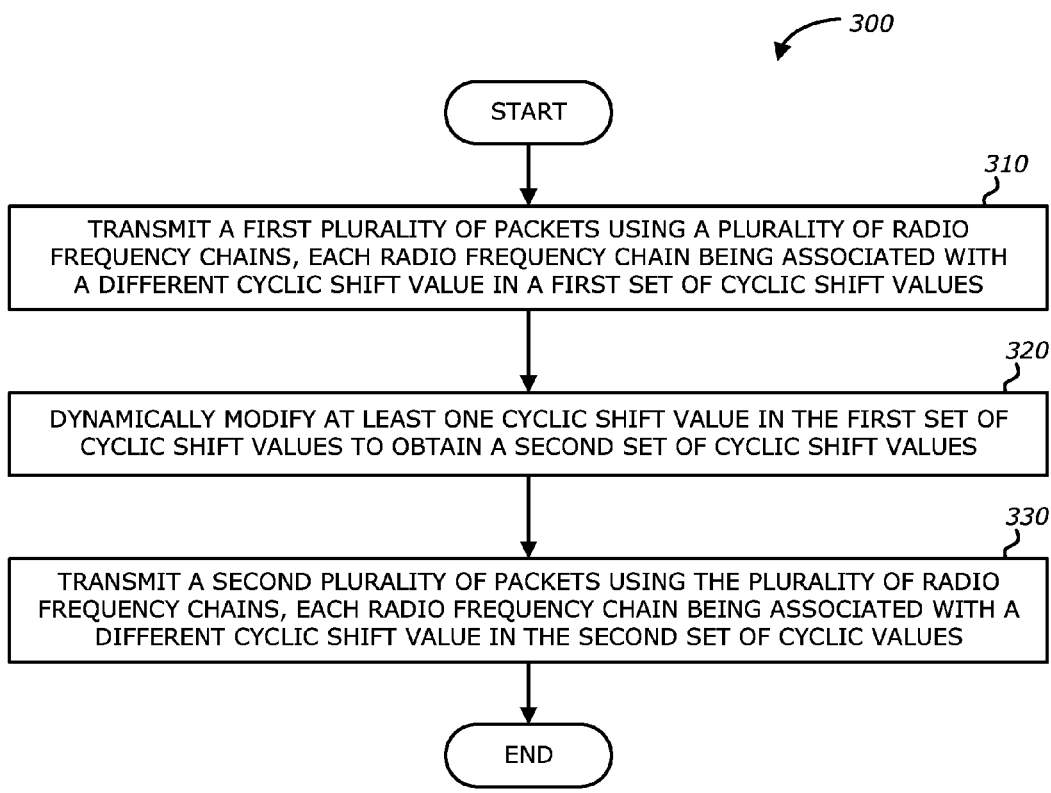
FIG. 3 is an exemplary flow diagram illustrating a method for adaptive per-user multipath control for spatial multiplexing gain in MIMO systems.

Referring now to FIG. 3, an exemplary flow diagram illustrating a method 300 for adaptive per-user multipath control for spatial multiplexing gain in MIMO systems is shown. At block 310, a first plurality of packets are transmitted with communication interface logic 250 of FIG. 2 from a first device to a second device, the first plurality of packets being transmitted using a plurality of radio frequency chains, each radio frequency chain being associated with a different cyclic shift value in a first set of cyclic shift values. At block 320, based on performance information, at least one cyclic shift value in the first set of cyclic shift values is dynamically modified at CSD logic 285 to obtain a second set of cyclic shift values. At block 330, a second plurality of packets are transmitted with communication interface logic 250 from the first device to the second device, the second plurality of packets being transmitted using the plurality of radio frequency chains, each radio frequency chain being associated with a different cyclic shift value in the second set of cyclic shift values.

Methods according to the first group of embodiments may be applied on a per-client basis or on a per-radio basis, and may be used with or without TxBF.

Second Group of Embodiments

In the second group of embodiments, cyclic shift values for data streams are modified at CSD logic 285 to achieve optimal performance. As with the first group of embodiments, the optimal set of cyclic shift values vary depending on the client device, the environment, and/or the MCS used and may change over time. In one embodiment, minimum and maximum cyclic shift values are defined for space-time data streams so that applying CSD does not cause Inter-Symbol Interference (ISI) and does not cause shifts that fall out of the maximum delay spread values supported by radio receivers.

As with the first group of embodiments, in one embodiment, an algorithm (executed by processor 240) for finding the optimal set of cyclic shift values based on performance information is utilized. First, a set of default cyclic shift values are used; the cyclic shift values used are then recursively modified and tested based on performance information until an optimal set of cyclic shift values are found that enable the highest possible MCS with the lowest packet error rate. The optimal set of cyclic shift values may also be defined as the set of cyclic shift values that result in the highest possible SNR. The use of different types of performance information has been contemplated. The performance information may be feedback information such as acknowledgment packets sent by client device 120 and received by network device 110, may be information derived from such feedback information at network device 110, or may be information related to such metrics as Number of Retries in the event that network device 110 fails to receive feedback information from client device 120. Examples of the types of performance information provided herein are illustrative and do not limit the invention.

Figure 4:
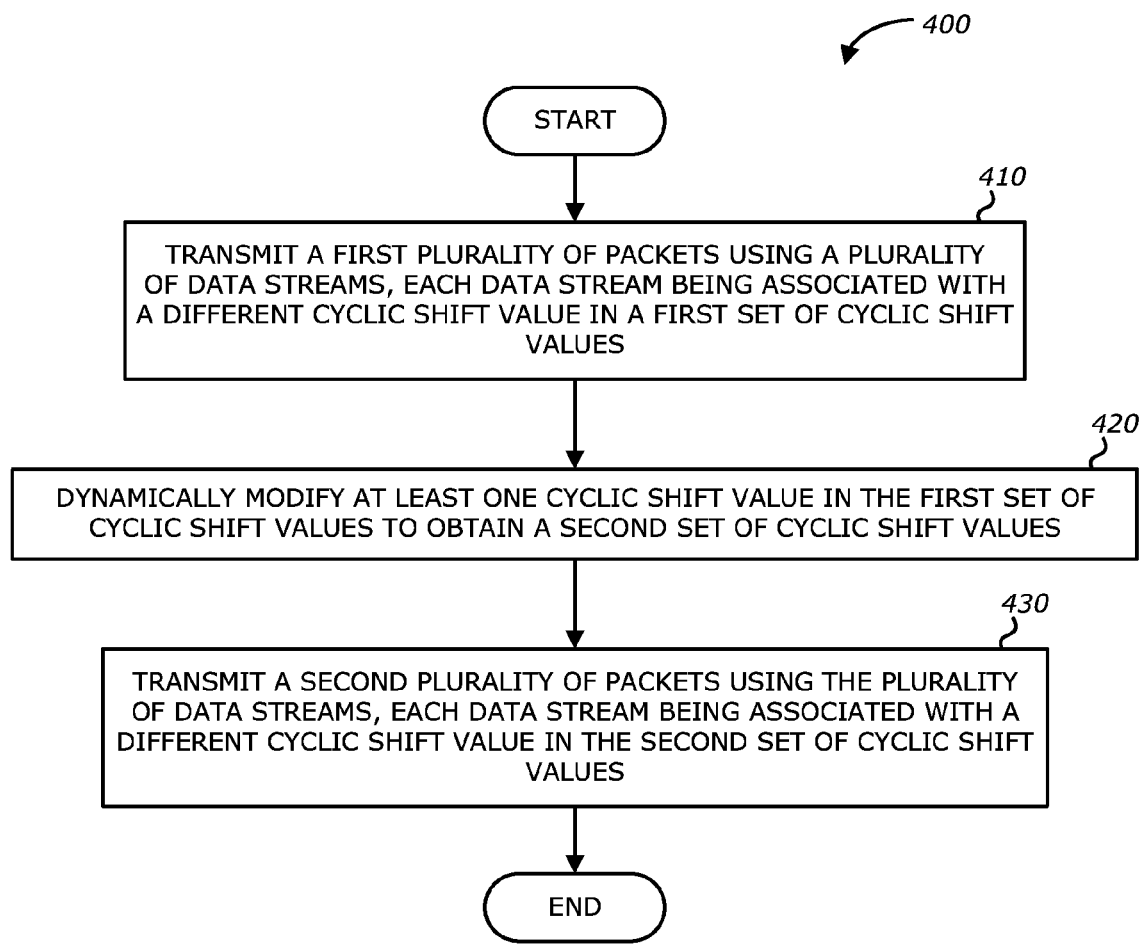
FIG. 4 is an exemplary flow diagram illustrating a method for adaptive per-user multipath control for spatial multiplexing gain in MIMO systems.

Referring now to FIG. 4, an exemplary flow diagram illustrating a method 400 for adaptive per-user multipath control for spatial multiplexing gain in MIMO systems is shown. At block 410, a first plurality of packets are transmitted with communication interface logic 250 of FIG. 2 from a first device to a second device, the first plurality of packets being transmitted using a plurality of data streams, each data stream being associated with a different cyclic shift value in a first set of cyclic shift values. At block 420, based on performance information, at least one cyclic shift value in the first set of cyclic shift values is dynamically modified at CSD logic 285 to obtain a second set of cyclic shift values. At block 430, a second plurality of packets are transmitted with communication interface logic 250 from the first device to the second device, the second plurality of packets being transmitted using the plurality of data streams, each data stream being associated with a different cyclic shift value in the second set of cyclic shift values.

As with the first group of embodiments, methods according to the second group of embodiments may be applied on a per-client basis or on a per-radio basis, and may be used with or without TxBF.

Third Group of Embodiments

Methods according to the third group of embodiments are applicable when wireless network device 110 is equipped with beamforming antennas or smart antennas. The antennas may be directional antennas. With beamforming antennas or smart antennas, beam width and/or beam orientation for each RF beam may be modified to better exploit multipath RF propagation so that optimal performance may be achieved for a given client device.

In one embodiment, an algorithm (executed by processor 240) for finding the optimal set of beam widths based on performance information is utilized. First, a set of default beam widths are used; the beam widths used are then recursively modified and tested based on performance information until an optimal set of beam widths are found that enable the highest possible MCS with the lowest packet error rate. The optimal set of beam widths may also be defined as the set of beam widths that result in the highest possible SNR. The use of different types of performance information has been contemplated. The performance information may be feedback information such as acknowledgment packets sent by client device 120 and received by network device 110, may be information derived from such feedback information at network device 110, or may be information related to such metrics as Number of Retries in the event that network device 110 fails to receive feedback information from client device 120. Examples of the types of performance information provided herein are illustrative and do not limit the invention.

Figure 5:
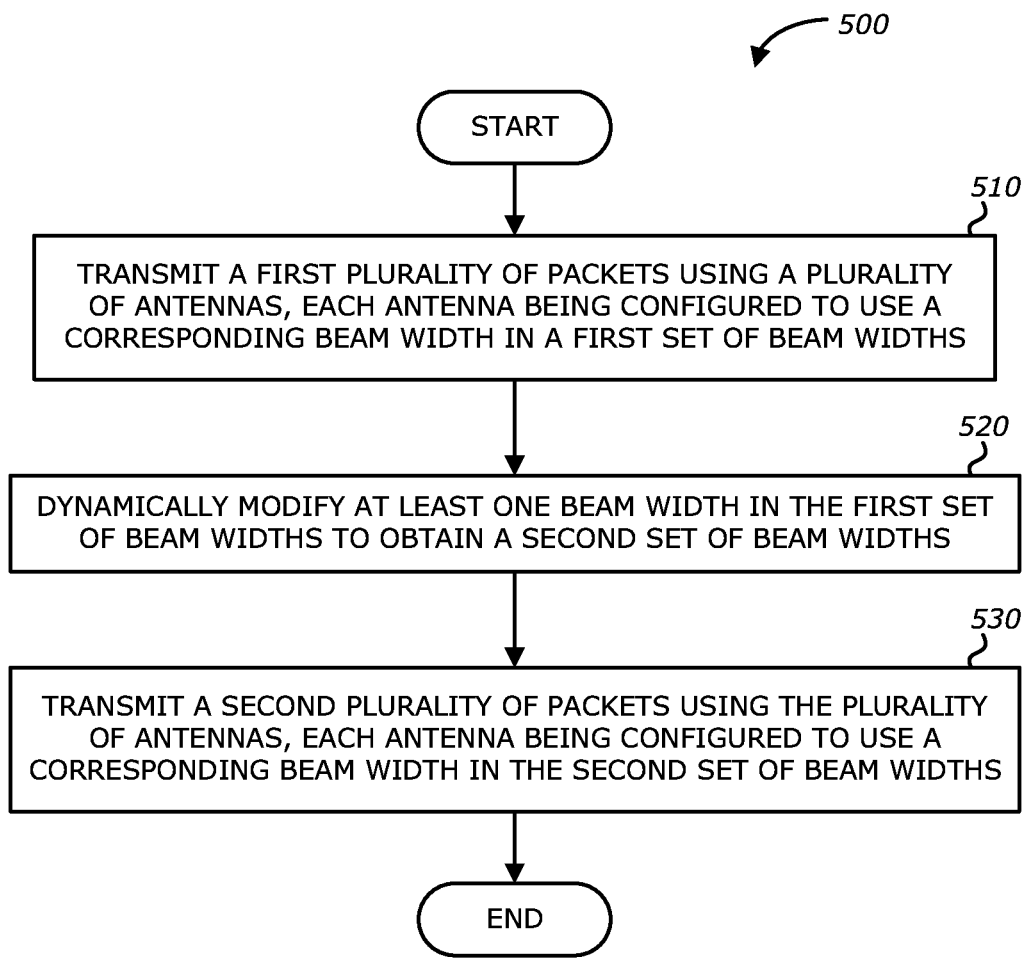
FIG. 5 is an exemplary flow diagram illustrating a method for adaptive per-user multipath control for spatial multiplexing gain in MIMO systems.

Referring now to FIG. 5, an exemplary flow diagram illustrating a method 500 for adaptive per-user multipath control for spatial multiplexing gain in MIMO systems is shown. At block 510, a first plurality of packets are transmitted with communication interface logic 250 of FIG. 2 from a first device to a second device, the first plurality of packets being transmitted using a plurality of antennas, each antenna being configured to use a corresponding beam width in a first set of beam widths. At block 520, based on performance information, at least one beam width in the first set of beam widths is dynamically modified to obtain a second set of beam widths. At block 530, a second plurality of packets are transmitted with communication interface logic 250 from the first device to the second device, the second plurality of packets being transmitted using the plurality of antennas, each antenna being configured to use a corresponding beam width in the second set of beam widths.

Methods according to the third group of embodiments may be applied on a per-client basis, and may be used with or without TxBF.

Fourth Group of Embodiments

In the fourth group of embodiments, a selection is made as to whether applying cyclic shifts at CSD logic 285 should occur before or after IDFT to achieve better performance. The optimal selection varies depending on the client device, the environment, and/or the MCS used and may change over time. Whether cyclic shifts should be applied before or after IDFT may be determined based on performance information. The better selection is the one that enables a higher possible MCS with a lower packet error rate. The better selection may also be defined as the selection that results in a higher SNR. The use of different types of performance information has been contemplated. The performance information may be feedback information such as acknowledgment packets sent by client device 120 and received by network device 110, may be information derived from such feedback information at network device 110, or may be information related to such metrics as Number of Retries in the event that network device 110 fails to receive feedback information from client device 120. Examples of the types of performance information provided herein are illustrative and do not limit the invention.

Applying cyclic shifts before or after IDFT results in different space diversity because applying cyclic shifts after applying the IDFT results in a shift in a time domain between packets transmitted using different radio frequency chains, whereas applying cyclic shifts before applying the IDFT results in a shift in a frequency domain between packets transmitted using different radio frequency chains.

Figure 6:
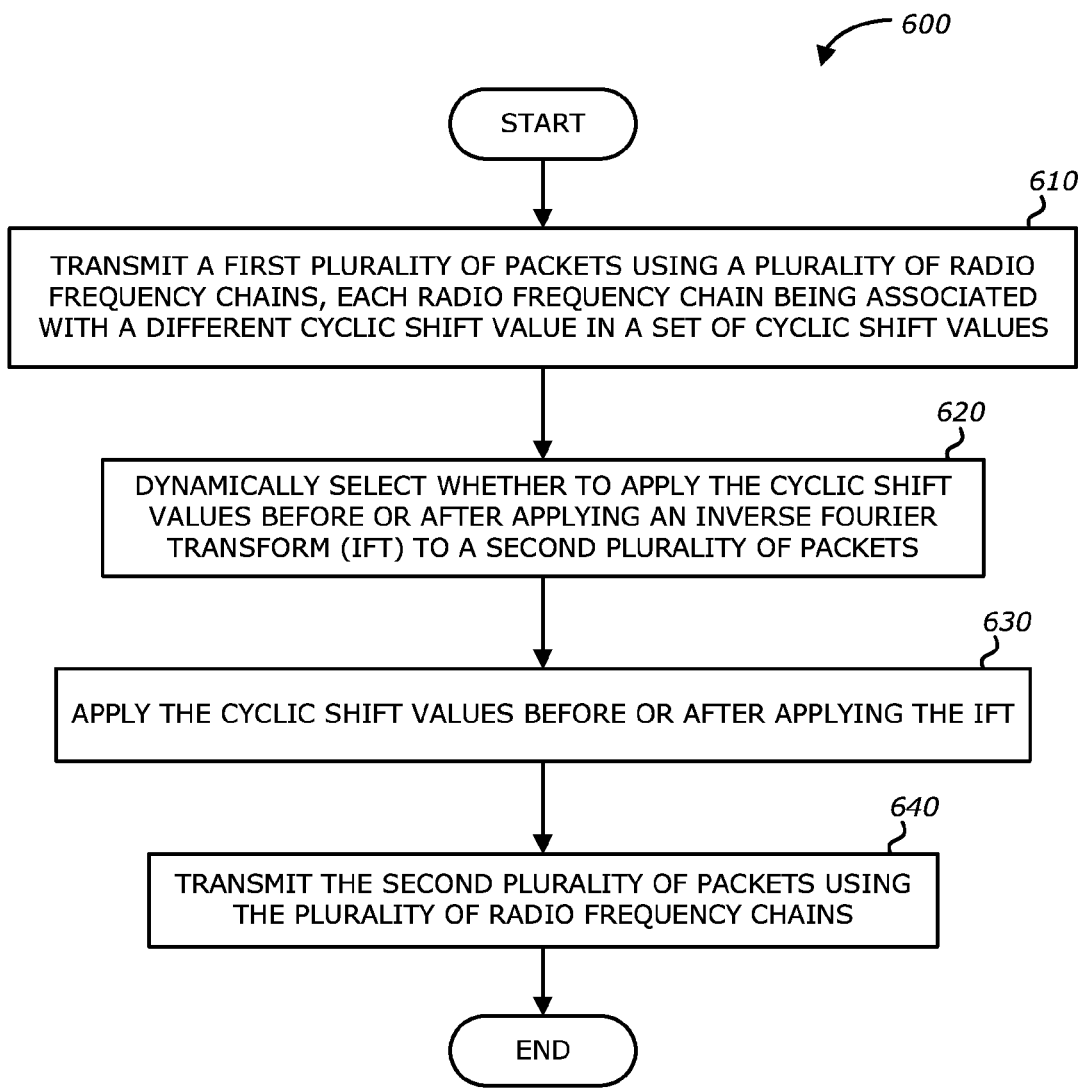
FIG. 6 is an exemplary flow diagram illustrating a method for adaptive per-user multipath control for spatial multiplexing gain in MIMO systems.

Referring now to FIG. 6, an exemplary flow diagram illustrating a method 600 for adaptive per-user multipath control for spatial multiplexing gain in MIMO systems is shown. At block 610, a first plurality of packets are transmitted with communication interface logic 250 of FIG. 2 from a first device to a second device, the first plurality of packets being transmitted using a plurality of radio frequency chains, each radio frequency chain being associated with a different cyclic shift value in a set of cyclic shift values. At block 620, based on performance information, whether to apply the cyclic shift values at CSD logic 285 before or after applying an Inverse Fourier Transform (IFT) at IDFT logic 290 to a second plurality of packets is dynamically selected. At block 630, the cyclic shift values are applied at CSD logic 285 before or after applying the IFT based on the performance information. At block 640, the second plurality of packets are transmitted with communication interface logic 250 from the first device to the second device, the second plurality of packets being transmitted using the plurality of radio frequency chains.

Methods according to the fourth group of embodiments may be applied on a per-client basis or on a per-radio basis, and may be used with or without TxBF. Moreover, methods according to the fourth group of embodiments may be combined with methods according to the first or second groups of embodiments. In other words, depending on the performance information, cyclic shifts may be advantageously applied to data streams, to transmit chains before IFT, or to RF chains after IFT, and the cyclic shift values may be modified to achieve higher spatial multiplexing gain.

Utilizing embodiments of the disclosure described herein allows for increased spatial multiplexing gain of a wireless digital network through better exploitation of multipath RF propagation.

While the invention has been described in terms of various embodiments, the invention should not be limited to only those embodiments described, but can be practiced with modification and alteration within the spirit and scope of the appended claims. The description is to be regarded as illustrative rather than limiting.

What is claimed is:

1. A non-transitory computer readable medium comprising instructions which, when executed by at least one processor, cause the at least one processor to:
   transmit a first plurality of packets from a first device to a second device, the first plurality of packets being transmitted using a plurality of radio frequency chains, each radio frequency chain being associated with a different cyclic shift value in a first set of cyclic shift values;
   based on performance information analyzed at the first device, dynamically modify at least one cyclic shift value in the first set of cyclic shift values to obtain a second set of cyclic shift values, wherein the performance information is determined in response to the transmitting of the first plurality of packets from the first device to the second device; and
   transmit a second plurality of packets from the first device to the second device, the second plurality of packets being transmitted using the plurality of radio frequency chains, each radio frequency chain being associated with a different cyclic shift value in the second set of cyclic shift values.

2. The non-transitory computer readable medium of claim 1, wherein the instructions cause the at least one processor to recursively modify and test cyclic shift values to find a set of cyclic shift values that enable an optimal performance.

3. The non-transitory computer readable medium of claim 1, wherein the cyclic shift values are used either before or after an Inverse Fourier Transform (IFT).

4. The non-transitory computer readable medium of claim 1, wherein the modifying of at least one cyclic shift value is based on a signal-to-noise ratio (SNR).

5. The non-transitory computer readable medium of claim 1, wherein the cyclic shift values are values associated with shifts to signals transmitted by the first device.

6. The non-transitory computer readable medium of claim 1, wherein the performance information comprises acknowledgment packets corresponding to the first plurality of packets and received by the first device from the second device.

7. A non-transitory computer readable medium comprising instructions which, when executed by at least one processor, cause the at least one processor to:
   transmit a first plurality of packets from a first device to a second device, the first plurality of packets being transmitted using a plurality of data streams, each data stream being associated with a different cyclic shift value in a first set of cyclic shift values;
   based on performance information analyzed at the first device, dynamically modify at least one cyclic shift value in the first set of cyclic shift values to obtain a second set of cyclic shift values, wherein the performance information is determined in response to the transmitting the first plurality of packets from the first device to the second device; and
   transmit a second plurality of packets from the first device to the second device, the second plurality of packets being transmitted using the plurality of data streams, each data stream being associated with a different cyclic shift value in the second set of cyclic shift values.

8. The non-transitory computer readable medium of claim 7, wherein the instructions cause the at least one processor to recursively modify and test cyclic shift values to find a set of cyclic shift values that enable an optimal performance.

9. The non-transitory computer readable medium of claim 7, wherein the modifying of at least one cyclic shift value is based on a signal-to-noise ratio (SNR).

10. The non-transitory computer readable medium of claim 7, wherein the cyclic shift values are values associated with shifts to signals transmitted by the first device.

11. The non-transitory computer readable medium of claim 7, wherein the performance information comprises acknowledgment packets corresponding to the first plurality of packets and received by the first device from the second device.

12. A non-transitory computer readable medium comprising instructions which, when executed by at least one processor, cause the at least one processor to:
   transmit a first plurality of packets from a first device to a second device, the first plurality of packets being transmitted using a plurality of antennas, each antenna being configured to use a corresponding beam width in a first set of beam widths;
   based on performance information analyzed at the first device, dynamically modify at least one beam width in the first set of beam widths to obtain a second set of beam widths, wherein the performance information is determined in response to the transmitting of the first plurality of packets from the first device to the second device; and
   transmit a second plurality of packets from the first device to the second device, the second plurality of packets being transmitted using the plurality of antennas, each antenna being configured to use a corresponding beam width in the second set of beam widths.

13. The non-transitory computer readable medium of claim 12, wherein the plurality of antennas are directional antennas.

14. The non-transitory computer readable medium of claim 12, wherein the performance information comprises acknowledgment packets corresponding to the first plurality of packets and received by the first device from the second device.

15. A non-transitory computer readable medium comprising instructions which, when executed by one or more devices, cause the at least one processor to:
   transmit a first plurality of packets from a first device to a second device, the first plurality of packets being transmitted using a plurality of radio frequency chains, each radio frequency chain being associated with a different cyclic shift value in a set of cyclic shift values;
   based on performance information analyzed at the first device, dynamically select whether to apply the cyclic shift values before or after applying an Inverse Fourier Transform (IFT) to a second plurality of packets, wherein said performance information is determined in response to the transmitting of the first plurality of packets from the first device to the second device;
   apply the cyclic shift values before or after applying the IFT based on the performance information; and
   transmit the second plurality of packets from the first device to the second device, the second plurality of packets being transmitted using the plurality of radio frequency chains.

16. The non-transitory computer readable medium of claim 15, wherein the instructions are further to cause the at least one processor to modify the set of cyclic shift values based on the performance information.

17. The non-transitory computer readable medium of claim 16, wherein the instructions cause the at least one processor to recursively modify and test cyclic shift values to find a set of cyclic shift values that enable an optimal performance.

18. The non-transitory computer readable medium of claim 15, wherein the determining of whether to apply the cyclic shift values before or after applying the IFT is further based on a signal-to-noise ratio (SNR).

19. The non-transitory computer readable medium of claim 15, wherein the cyclic shift values are values associated with shifts to signals transmitted by the first device.

20. The non-transitory computer readable medium of claim 15, wherein the performance information comprises acknowledgment packets corresponding to the first plurality of packets and received by the first device from the second device.

21. The non-transitory computer readable medium of claim 15, wherein applying the cyclic shift values after applying the IFT results in a shift in a time domain between packets transmitted using different radio frequency chains.

22. The non-transitory computer readable medium of claim 15, wherein applying the cyclic shift values before applying the IFT results in a shift in a frequency domain between packets transmitted using different radio frequency chains.

* * * * *